March 2, 1926.
G. W. ROSS
1,574,850
BRAKE
Filed May 25, 1922
2 Sheets-Sheet 1
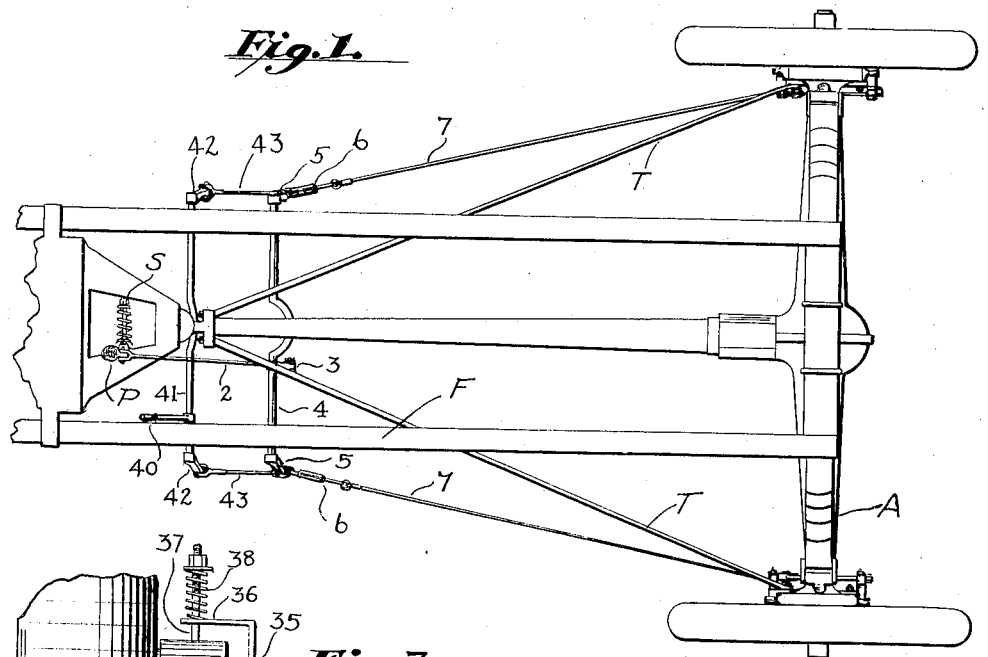
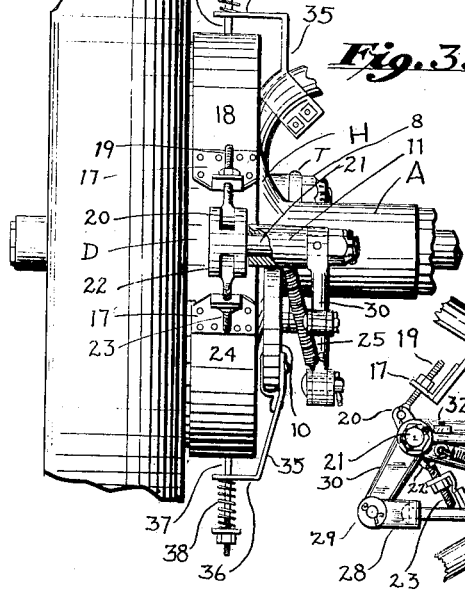
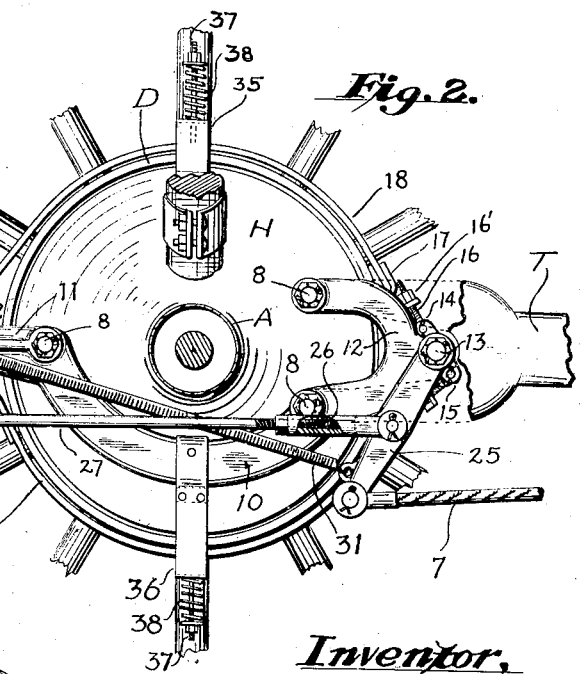
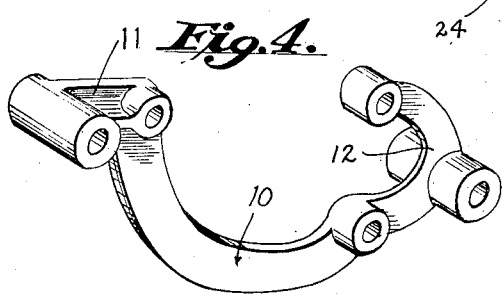
Inventor,
George W. Ross.
By Hazard & Miller
Attorneys March 2, 1926.
G. W. ROSS
BRAKE
Filed May 25, 1922     2 Sheets-Sheet 2
1,574,850
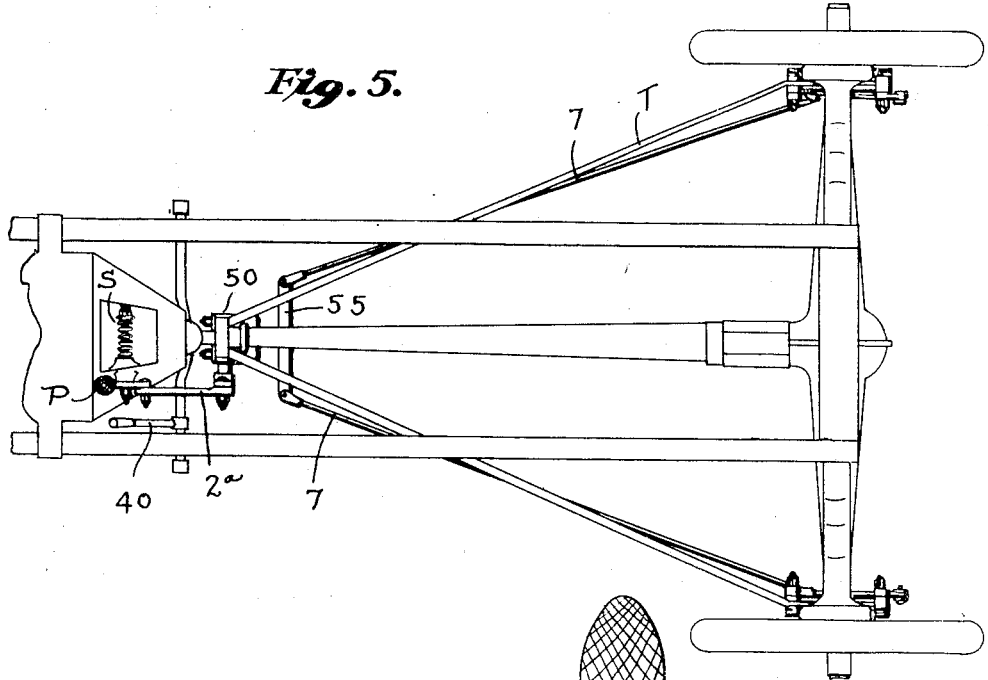
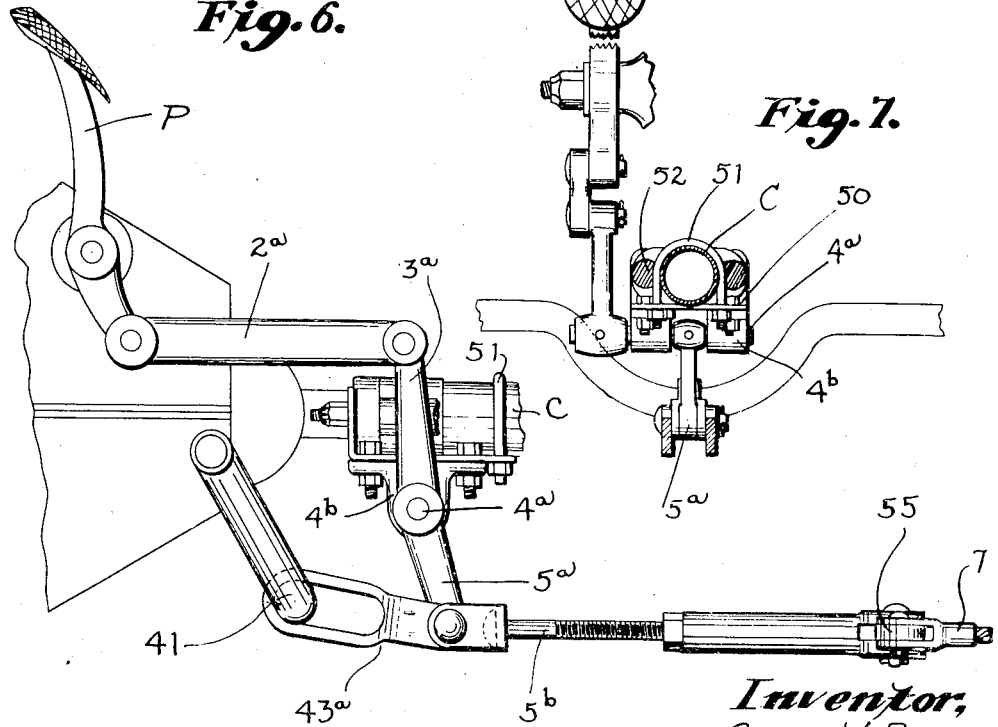
Inventor,
George W. Ross
By Hazard & Miller
Attorneys.

Patented Mar. 2, 1926.

1,574,850

UNITED STATES PATENT OFFICE.

GEORGE W. ROSS, OF HUNTINGTON PARK, CALIFORNIA, ASSIGNOR TO F. L. HETZEL AND A. H. HETZEL, BOTH OF LOS ANGELES, CALIFORNIA.

BRAKE.

Application filed May 25, 1922. Serial No. 563,627.

*To all whom it may concern:*

Be it known that I, GEORGE W. ROSS, a citizen of the United States, residing at Huntington Park, in the county of Los Angeles and State of California, have invented new and useful Improvements in Brakes, of which the following is a specification.

This invention relates to vehicle brakes and more particularly relates to a brake mechanism adapted to be readily combined with certain touring and other cars and trucks.

An object of the invention is to eliminate the usual emergency brake of certain vehicles. Another object is to eliminate the usual solid brake rods and, therefore, to overcome the noise incident to the use of said rods.

A further object is to provide a brake mechanism capable of being used both for service and for emergency purposes.

Another object is to provide a brake apparatus that may be readily installed with types of motor propelled vehicles as above mentioned in such manner as not to interfere with the application, to the brake housings, of various forms of shock absorbers, and in this connection an object is to provide a brake apparatus attachable to the regular brake equipment and braking housings of cars without necessitating any material changes or alterations therein.

A further object is to provide a brake mechanism including a brake pedal and a hand lever independently operable for the setting of the brakes, and also to utilize the foot pedal which is associated with the usual service brake in such manner that this latter may be connected up to serve its usual purposes substantially without change in the applied brake of the present invention.

Other objects will be made manifest in the following specification of an embodiment of the invention illustrated in the accompanying drawings, in which:

Fig. 1 is a plan showing somewhat diagrammatically the attachment of the improved mechanism to a portion of the running gear of a motor vehicle.

Fig. 2 is a side elevation showing the improved brake mechanism as applied to the usual brake housing of a motor vehicle.

Fig. 3 is an elevation in a plane at right angles to that of Fig. 2.

Fig. 4 is a perspective of one of the attachment frames.

Fig. 5 is a plan of a portion of a chassis to which a modified form of the invention is attached.

Fig. 6 is a side elevation of the modified arrangement of brake controls.

Fig. 7 is an end view of the structure shown in Fig. 6.

One of the broader objects of the present invention is to provide a brake mechanism of the contraction type, the effective brake straps of which are adapted to be readily combined with the usual brake drums of a motor vehicle, or other suitable vehicle, if desired, and thereby to eliminate the operation of the usual service brake controlling the transmission mechanism of the vehicle.

The present invention is associated with the usual brake pedal P operating the service brake of the vehicle and which is designed to be inoperative when the present attachment is combined with the mechanism as by the loosening up of the brake control spring S.

This usual brake pedal P is connected, preferably, by a flexible link 2 in the form of a substantial cable to a lever arm 3 fixed to a rock shaft 4 arranged transversely in suitable bearings on the chassis frame F. To the ends of the rock shaft 4 are attached lever arms 5 and to these are, preferably, attached turn buckles 6 from which extend flexible links, preferably in the form of cables 7 which at their rear ends are connected to the improved brake mechanism of this invention.

This brake mechanism, preferably, includes a substantial frame member adapted to be rigidly secured to the usual brake housing or case H, Fig. 2, which is normally provided with apertures to receive bolts passing therethrough in its end wall. The usual bolts are dispensed with and, in the present case, bolts of same diameter but of greater length are used and these bolts are indicated at 8 as passing through the housing wall H of the usual expansion brake, not shown in detail, and which is within the housing. A set of bolts 8 is designed to receive and support an attaching frame consisting of a downwardly bowed body 10 designed to lie beneath the axle housing A; the rear arm of the frame 10 extending upwardly and receiving the rear bolt 8. Beyond rear bolt 8 is provided a horizontal extension 11.

The front portion of the arm is provided with a U-shaped end 12 receiving the forward upper and lower bolts 8 fixed in the housing H. In this manner the frame 10 is securely held in applied position to the side of the housing.

At the forward end of the frame there is provided a bearing for a short rock shaft 13 having diametrically opposed short lever arms 14 and 15. To the upper lever arm 14 there is pivotally connected an adjustment bolt 16 receiving a hook part 17 provided on the end of a semi-circular and upper brake strap 18 passing over the upper part of the brake drum D. The rear end of the brake strap 18 is connected by an adjustment screw 19 to a short lever arm 20 secured to a rock shaft 21 journaled in the rear end of the frame extension 11.

The rock shaft is provided with a downwardly extending, short lever arm 22 pivotally receiving an adjustment screw 23 to which is adjustably attached the lower brake strap 24 passing around below the brake drum D and being attached at its forward upper end to the lower lever arm 15 on the rock shaft 13 above mentioned. The angular relation of the strap levers 14—15 and 20—22 is such that when the rock shaft 13 pivoted in the forward end of the frame part 12 is rotated in one direction, the straps 18 and 24 are brought into frictional engagement with the brake drum D and, therefore, a braking effect is secured.

Concurrent and coordinate operation of the brake setting levers fixed to the shafts 13 and 21, respectively, is secured by suitable means here comprising a downwardly extending main lever 25 fixed as by pin or key to the rock shaft 13 and to which main lever is attached the rear end of the respective brake setting cable 7 of Fig. 1. This lever 25 is attached, intermediate its ends, to an adjustable link consisting of a threaded sleeve 26 and a rod section 27 screwed thereinto and which has at its rear end a yoke or shackle 28 which is pivotally connected at 29 to the lower end of a lever arm 30 fixed on the rear rock shaft 21 in the frame 10.

From this it will be seen that each of the brake drums on the wheels of the chassis is designed to be embraced when the respective brake straps 18—24 are contracted thereon by throwing the pedal P to draw up the brake cables 7; these latter in turn pulling on the main levers 25 of the brake mechanism associated with the brake housings. The action of the main levers 25 is transmitted through the connecting link 26—27 to the rear respective levers 30 and these throw the rock shafts 21 so that both ends of each of the brake straps 18 and 24 of the brake organization are quickly contracted upon the drum. The tension of the bands is regulated by setting up the take up devices 16 and 19, for instance, at the strap ends; each of the take up or adjustment screws being provided with a clamp or lock nut as 16' bearing against the respective ears of the attachments 17.

For the purpose of elminating slack and chattering parts in each brake organization, a contractile spring 31 is shown as connected to the main lever 25 of each brake mechanism and is also attached as by an eye bolt or other means 32 which may be conveniently provided in the rearward extension 11 of frame 10.

Also, means are provided for preventing chattering of the brake straps when they are in the released position and such means includes a suitable bracket arm 35 for each strap; these bracket arms being secured to the brake housing disc H and having overhanging arms 36 through which pass radially extending pins 37 whose inner ends are attached to the contiguous brake straps. On the outer ends of the pins are arranged expansion springs 38 reacting between the brackets 36 and the heads of the pins in such manner as to tend to pull the brake straps outwardly from the brake ring or drum.

The brake mechanisms are adapted to be concurrently applied, either by pressure on the brake pedal P or they may be applied through a hand lever 40 which is secured to a rock shaft 41 journaled on the chassis frame and carrying, at its ends, arms 42 which in turn are connected by link means, preferably pieces of cable, 43 to the adjacent lever arms 5 of the rock shaft 4.

From the above it will be seen that the entire attachment can be readily mounted in combination with the usual chassis and brake organization of a given type of car and the arrangement of the parts of the brake devices is such that shock absorbers and other accessories may, if desired, be readily installed without interference from the present contraction brake mechanism.

It will be seen that when the usual service brake device diagrammatically shown at S is disconnected the present attachment serves the dual function of an emergency and ordinary service brake. Should it be desired to utilize the regular service brake of the equipment then the device S will be set up tight and the service brake operated by the pedal P, all without any interference by virtue of the present attachment.

The usual torque rods T are utilized and these are attached by the front bolts 8 at the forward ends of the frame 10.

A somewhat modified form of the invention is shown in Figs. 5, 6 and 7 wherein the usual pedal P is attached to a compression link 2ª which in turn is connected to an upstanding lever arm 3ª fastened on a short rock shaft 4ª having a downwardly extending lever arm 5ª. The rock shaft 4ª is designed to be conveniently attached to the propeller shaft casing C. To that end the rock shaft 4ª is mounted in bearings 4ᵇ formed upon or attached to a bracket plate or hanger 50 which may be secured to a U-bolt 51 passing around the propeller shaft casing C, and the bracket is also provided with ears or lugs to receive fastening bolts 52 for effecting a secure attachment of the bracket. This eliminates the type of rock shaft 40, Fig. 1, which is mounted in the side members of the chassis frame F.

The brake applying lever 5ª is connected to a link 43ª slotted to receive the bow of the cross shaft 41 of the usual hand lever 40 so that the brake mechanism can be applied either by the operation of the pedal P or by the hand lever 40.

For the purpose of securing an equalizing action in the device, the lever 5ª is attached to a link 5ᵇ, the rear end of which is connected to an equalizing device in the form of a transverse lever 55 to the ends of which the brake links 7 are attached.

Various modifications and changes may be resorted to within the spirit of the invention as claimed.

What is claimed is:

1. In a brake device for vehicles having fixed housings and drums secured to driven wheels, a frame member adapted to be secured to each brake housing and having forwardly and rearwardly arranged rock shaft bearings, rock shafts provided in said bearings and having lever arms diametrically arranged on respective shafts, brake straps arranged above and below the brake drum of each wheel and respectively connected to said lever arms of the rock shafts.

2. In a brake device for vehicles having fixed housings and drums secured to driven wheels, a frame member adapted to be secured to each brake housing and having forwardly and rearwardly arranged rock shaft bearings, rock shafts provided in said bearings and having lever arms diametrically arranged on respective shafts, brake straps arranged above and below the brake drum of each wheel and respectively connected to said lever arms of the rock shafts, and means for concurrently actuating the rock shafts so as to apply, by contraction, the brake straps of each drum.

3. In a brake device for vehicles having fixed housings and drums secured to driven wheels, a frame member adapted to be secured to each brake housing and having forwardly and rearwardly arranged rock shaft bearings, rock shafts provided in said bearings and having lever arms diametrically arranged on respective shafts, brake straps arranged above and below the brake drum of each wheel and respectively connected to said lever arms of the rock shafts, and means for providing for adjustment of the brake straps.

4. In a brake device for vehicles having fixed housings and drums secured to driven wheels, a frame member adapted to be secured to each brake housing and having forwardly and rearwardly arranged rock shaft bearings, rock shafts provided in said bearings and having lever arms diametrically arranged on respective shafts, brake straps arranged above and below the brake drum of each wheel and respectively connected to said lever arms of the rock shafts, said rock shafts having each a main lever and an adjustable connection between said main levers.

5. In a brake device for vehicles having fixed housings and drums secured to driven wheels, a frame member adapted to be secured to each brake housing and having forwardly and rearwardly arranged rock shaft bearings, rock shafts provided in said bearings and having lever arms diametrically arranged on respective shafts, brake straps arranged above and below the brake drum of each wheel and respectively connected to said lever arms of the rock shafts, said rock shafts having each a main lever and an adjustable connection between said main levers, and a contractile take up spring for preventing lost motion and play of the relaxed lever mechanisms.

6. In a brake device for vehicles having fixed housings and drums secured to driven wheels, a frame member adapted to be secured to each brake housing and having forwardly and rearwardly arranged rock shaft bearings, rock shafts provided in said bearings and having lever arms diametrically arranged on respective shafts, brake straps arranged above and below the brake drum of each wheel and respectively connected to said lever arms of the rock shafts, the said frame being constructed and arranged to match with usual bolt holes provided in the said housings, and bolts for fastening the frames to the respective housings by passing through the said holes therein.

7. A brake operating attachment for motor vehicles comprising a bracket member attachable to chassis elements of the vehicle, a brake operating rock shaft mounted in the bracket member, a lever arm secured to one end of the rock shaft and extending upwardly, and a compression link attached to said lever arm and at one end to the usual brake pedal of the vehicle so that the mechanism will be applied by the action of the brake pedal.

8. A brake operating attachment for motor vehicles comprising a bracket member attachable to chassis elements of the vehicle, a rock shaft mounted in the bracket member and having a downwardly extending lever arm, a lever arm secured to one end of the rock shaft and extending upwardly, and a compression link attached at one end to the usual brake pedal of the vehicle so that the mechanism will be applied by the action of the brake pedal, the downwardly extending lever arm of the rock shaft being connected to a lost motion link which is adapted for connection to a hand lever operated rock shaft so that the brake mechanism can be set either by pedal action or by hand lever action.

In testimony whereof I have signed my name to this specification.

GEO. W. ROSS.